United States Patent [19]

Mori

[11] Patent Number: 4,634,086

[45] Date of Patent: Jan. 6, 1987

[54] SOLAR RAY COLLECTING DEVICE FOR USE IN A SPACECRAFT

[76] Inventor: Kei Mori, 3-16-3-501, Kaminoge, Setagaya-ku, Tokyo, Japan

[21] Appl. No.: 800,906

[22] Filed: Nov. 22, 1985

Related U.S. Application Data

[63] Continuation-in-part of Ser. No. 670,692, Nov. 13, 1984, abandoned.

[30] Foreign Application Priority Data

Nov. 18, 1983 [JP] Japan .................................. 58-217146

[51] Int. Cl.⁴ ............................................... B64G 1/10
[52] U.S. Cl. .................................... 244/173; 126/411; 126/440
[58] Field of Search ............... 126/440, 450, 451, 417; 244/173; 136/243, 244, 245, 255

[56] References Cited

U.S. PATENT DOCUMENTS

| | | | |
|---|---|---|---|
| 416,959 | 5/1893 | Senery | 126/440 X |
| 1,658,455 | 2/1928 | Metzech et al. | 126/440 X |
| 3,064,534 | 11/1962 | Tumavicus | 126/451 X |
| 3,635,425 | 1/1972 | Swet | 244/173 |
| 3,948,468 | 4/1976 | Anchutin | 244/173 |
| 4,010,732 | 3/1977 | Sawata et al. | 126/440 X |
| 4,064,865 | 12/1977 | Depew | 126/440 X |
| 4,133,502 | 1/1979 | Anchutin | 244/173 |
| 4,377,266 | 3/1983 | Belew et al. | 244/173 X |
| 4,415,759 | 11/1983 | Copeland et al. | 244/173 X |
| 4,459,974 | 7/1984 | Lang | 126/440 |
| 4,588,151 | 5/1986 | Mori | 126/417 X |

*Primary Examiner*—Larry Jones
*Attorney, Agent, or Firm*—Jordan and Hamburg

[57] ABSTRACT

A solar ray collecting device suitable for being loaded and employed in a spacecraft. The device is made of a cylindrical cover, a plurality of round solar ray collecting portions, the light-receiving surface of which is equal in size to said cylindrical cover in square measure, supporting arms for rotatably supporting said solar ray collecting portions respectively, and supporting poles supporting said supporting arms respectively at the tip end portion thereof and capable of rotating and moving up and down. The solar ray collecting portions being taken out from the upper portion of said cylindrical cover at the time of being employed and accommodated in said cylindrical cover at the time of not being employed.

11 Claims, 5 Drawing Figures

SOLAR RAY COLLECTING DEVICE FOR USE IN A SPACECRAFT

This application is a continuation-in-part of application Ser. No. 670,692, filed Nov. 13, 1984, now abandoned.

BACKGROUND OF THE INVENTION

The present invention relates to a solar ray collecting device suitable for being loaded and employed in a spacecraft.

The present applicant has previously proposed various apparatuses and methods by which solar rays are focused by a lens or the like and guided into an optical conductor, and which are further transmitted through the optical conductor onto an optional desired place for use in illumination or for other purposes, specifically i.e. in order to use solar rays as a light source for nurturing chlorella, etc., or as a light source for photosynthesis.

Cosmic engineering has become highly developed in recent years. As a result of such progress, astronauts are obliged to stay in a spacecraft for longer periods of time. The supplying of oxygen and food to the astronouts inside the spacecraft arises as one of the most important problems. As a matter of course, when a rocket is launched, oxygen containers and an adequate food supply are included in the rocket. It is to be expected that the number of crew members will increase in the future and also the time spent in the spacecraft will increase. At the present time the amount of oxygen and food that can be stored in a spacecraft is limited. It is clear, according to this invention, that solar rays could be effectively collected for use inside of a spacecraft. Solar rays are the most effective light rays as a source of energy for cultivating plant life and for supplying oxygen resulting from plant cultivation.

SUMMARY OF THE INVENTION

It is an object of the present invention to provide a solar ray collecting device preferable for use in a spacecraft or the like which has been launched into space.

It is another object of the present invention to provide a solar ray collecting device that is easy to load and use in a spacecraft.

It is another object of the present invention to provide a solar ray collecting device which is comprised of a cylindrical cover, a plurality of round solar ray collecting portions, the light-receiving surface of which is equal to the cylindrical cover in square measure, supporting arms for rotatably supporting the solar ray collecting portions respectively, and supporting poles for supporting the supporting arms respectively at the tip end portion thereof and capable of rotating and moving up and down, the solar ray collecting portions being taken out from the upper portion of the cylindrical cover at the time of being employed and accommodated back into the cylindrical cover at the time of not being employed.

The above-mentioned features and other advantages of the present invention will be apparent from the following detailed description which goes with the accompanying drawings.

DESCRIPTION OF THE PREFERRED EMBODIMENTS

Figure 1:
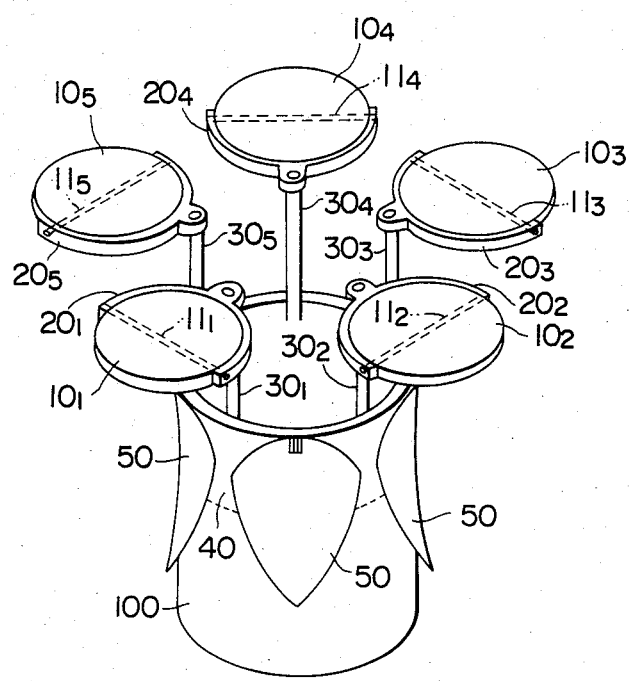
FIG. 1 is a perspective view for explaining an embodiment of the solar ray collecting device according to the present invention.

FIG. 1 is a perspective view for explaining an embodiment of the solar ray collecting device according to the present invention at the time of being employed. In FIG. 1, 100 is the outer wall of the spacecraft, $10_1$ through $10_5$ solar ray collecting portions, $20_1$ through $20_5$ supporting arms for rotatably supporting the solar ray collecting portions, $10_1$ through $10_5$ respectively, $30_1$ through $30_5$ are supporting poles for supporting said supporting arms $20_1$ through $20_5$ respectively at the tip end portion thereof and capable of rotating and moving up and down, and 40 a container for accommodating the solar ray collecting portions and other components which is unitarily formed with the spacecraft 100.

The supporting poles $30_1$ through $30_5$ are arranged rotatably and movably up and down in the container 40, and each supporting arm $20_1$ through $20_5$ is fixed on the upper end portion of each supporting pole $30_1$ through $30_5$ respectively. Each solar ray collecting portion, $10_1$ through $10_5$, is mounted on each supporting arm, $20_1$ through $20_5$, so as to be able to rotate around each rotatable shaft, $11_1$ through $11_5$, respectively.

Furthermore, as previously proposed by the present applicant, each solar ray collecting portion of a large number of lenses having a diameter of approximately 4 cm and optical fibers, the light-receiving edge surface of which is precisely positioned at the focal point of each lens. The solar rays focused by each lens are guided into each optical fiber and further transmitted onto an optional desired place for use in illumination or for other purposes.

In the case of employing such a small lens of about 4 cm in diameter, the focal distance of the lens is very small, for instance, about 4 cm. Consequently, it is possible to construct a solar ray collecting device which is made very thinly, and therefore which doesn't need much space. For this reason, such a solar ray collecting device as mentioned heretofore is desirable when it comes to saving storage space in a spacecraft.

Figure 2:
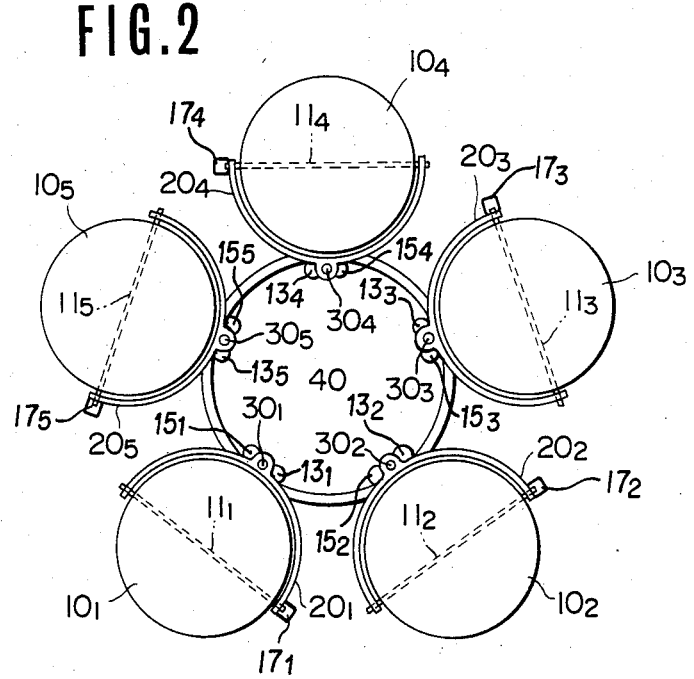
FIG. 2 is a plane view thereof at the time of being employed.

FIG. 2 is an outlined plan view showing the solar ray collecting device according to the present invention at the time of being employed. When the device is in use the supporting poles $30_1$ through $30_5$ for supporting each solar ray collecting portion $10_1$ through $10_5$ project from the cylindrical container 40, and the solar ray collecting portion is rotated 180° around the above-mentioned supporting pole and is in the position shown in FIG. 2.

A solar ray direction sensor, as previously proposed by the present applicant, is installed on each solar ray collecting portion. The rotatable shafts, $11_1$ through $11_5$, and the supporting poles, $30_1$ through $30_5$, are rotated in accordance with the output signal of the solar ray direction sensor so that the light-receiving surface of each solar ray collecting portion is controlled so as to be always directed in the direction of the solar rays' propagation.

Under these circumstances, since the front-side solar ray collecting portion facing the sun projects a shadow onto the rear-side solar ray collecting portion, by adjusting the height of each supporting pole, namely by controlling the front-side solar ray collecting portion so as to position it at a place lower than the rear-side solar ray collecting portion, all of the solar ray collecting portions can collect the sun's rays most effectively. FIG. 2 shows electric motor means $13_1$ through $13_5$ which engage the respective supporting poles $30_1$ through $30_5$ for rotating the supporting poles $30$ through $30_5$. FIG. 2 also shows electric motor means $15_1$ through $15_5$ which engage the respective supporting poles $30_1$ through $30_5$ for longitudinally extending and withdrawing the supporting poles $30_1$ through $30_5$. FIG. 2 further shows electric motor means $17_1$ through $17_5$ for rotating the respective shafts $11_1$ through $11_5$.

Figure 3:
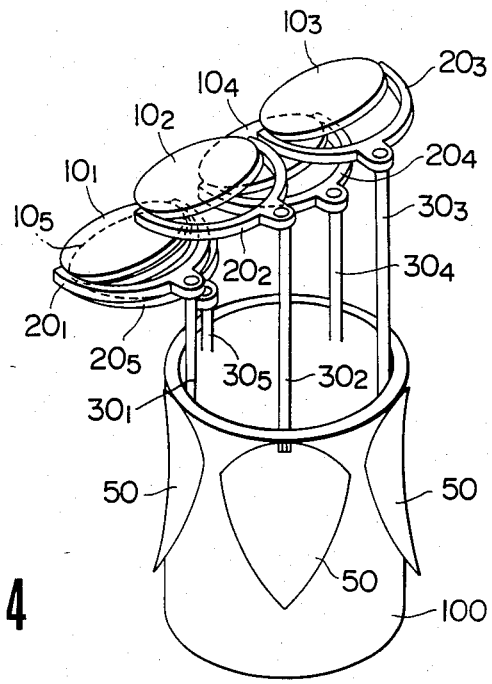
FIG. 3 is a perspective view in case that the solar rays come from the left-upper side of the drawing.
Figure 4:
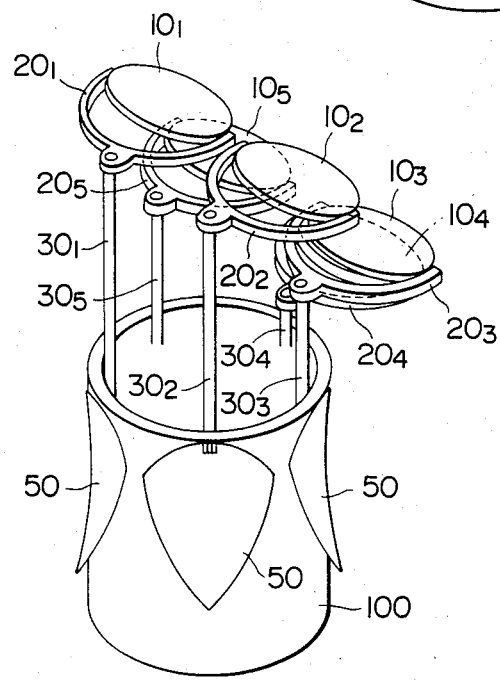
FIG. 4 is a perspective view in case that the solar rays come from the right-upper side of the drawing.

Namely, when the solar rays come from the left-upper side of FIG. 3, the left side solar ray collecting portion is situated at the lower place while the right side solar ray collecting portion is situated at the upper place, as shown in FIG. 3. On the contrary, when the solar rays come from the right-upper side of FIG. 3, the right side solar ray collecting portion is situated at the lower place while the left side solar ray collecting portion is situated at the upper place as shown in FIG. 4 so that all of the solar ray collecting portions are controlled in order to consistently collect the solar rays. With respect to changing the solar ray collecting device's height, when the solar rays come from right overhead, or in other words when the solar ray collecting portions, $10_1$ through $10_5$, are in the state as shown in FIG. 2, all of the solar ray collecting portions are exchanged with the others simultaneously. In such a manner, there is no fear that the solar ray collecting portion comes into contact with any other part. As a result the height thereof can be smoothly adjusted with the others.

In the state as shown in FIG. 4, when the solar ray collecting portions are being accommodated in the container, first the solar ray collecting portions are rotated 180° in order around the supporting poles thereof starting from the upper solar ray collecting portions, and secondly all of the solar ray collecting portions are accommodated in the container 40 by contracting the respective supporting poles into the container 40. Each solar ray collecting portion, $10_1$ through $10_5$, is constructed so as to fit the shape of the container 40. In the case of the embodiment as shown in FIG. 4, the solar ray collecting portion is formed in a round shape. The diameter D of the solar ray collecting portion is designed so as to make it as large as possible in consideration of the position of the supporting pole in the container and with respect to the total light-receiving square measure versus the accommodation square measure. On that occasion, five solar ray collecting devices can be most effectively arranged in a neighboring area around the accommodating cylinder as shown in FIG. 4.

Figure 5:
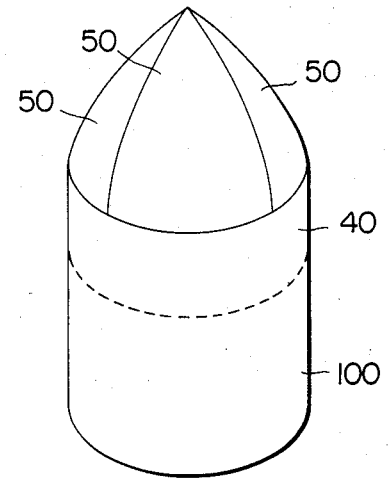
FIG. 5 is a side view of the solar ray collecting device at the time of not being employed.

FIG. 5 is a perspective view of the embodiment at the time of not being in use. When the solar ray collecting device is not being employed, the cover 50 covers and shuts off the cylindrical container in order to protect the solar ray collecting portions contained therein from being destroyed from dust, etc., as shown in FIG. 5.

The solar ray collecting device according to the present invention has been described heretofore. Since the solar ray collecting device according to the present invention, is loaded onto and employed inside a spacecraft, the device is not affected by gravity. Therefore, it is not necessary to have high-powered energy for moving the solar ray collecting portions up and down and for rotating them. Furthermore, each solar ray collecting portion can be supported rotatably on one tip end by means of a cantilevered type support as shown in FIGS. 1 through 4.

As is apparent from the foregoing description, according to the present invention, it may be possible to provide a solar ray collecting device which is light, efficient, and convenient for loading and employing in a spacecraft.

What is claimed is:

1. A solar ray collecting device loaded and employed in a spacecraft comprising a cylindrical container, a plurality of round solar ray collecting portions each having a light-receiving surface, each of said light-receiving surfaces having a surface area substantially equal to the circular cross-sectional area of the cylindrical container, supporting arms for rotatably supporting each of said solar ray collecting portions, and supporting poles supporting each of said supporting arms, said supporting poles being rotatable to thereby rotate said supporting arms and the solar ray collecting portion supported on the respective supporting arm about the axis of the respective supporting pole, said supporting poles being longitudinally moveable to longitudinally extend and withdraw said supporting arms and the solar ray collecting portions supported on the respective supporting arm, whereby said solar ray collecting portions are movable into a non-deployed position in which the solar ray collecting portions are accommodated within said cylindrical container and a deployed position in which said solar ray collecting portions are disposed outside of said cylindrical container for collecting solar rays.

2. A solar ray collecting device according to claim 1, wherein there are five of said solar ray collecting portions.

3. A solar ray collecting device according to claim 1, wherein a lid means for opening and shutting said cylindrical container is provided on the upper end portion of said cylindrical container.

4. A solar ray collecting device according to claim 3, wherein said lid means comprises a plurality of lid members pivotably mounted on said cylindrical container.

5. A solar ray collecting device according to claim 1, wherein said supporting arms each have a generally C-shaped configuration having two terminating end sections and a central section, and means on said end sections for rotatably supporting said round solar ray collecting portions for rotation about a diametrical axis.

6. A solar ray collecting device according to claim 5, further comprising means for mounting said supporting poles on the respective central section of said supporting arms.

7. A solar ray collecting device according to claim 1, whereby all of said round solar ray collecting portions are disposed in overlying and aligned relationship when in said non-deployed position in said cylindrical container.

8. A solar ray collecting device according to claim 1, wherein motor means are provided on each of said supporting arms for rotating the respective round solar ray collecting portions about an axis coinciding with a diametrical line passing through the center of the respective round solar ray collecting portions.

9. A solar ray collecting device according to claim 1, wherein motor means are provided for each of said supporting poles for longitudinally extending and withdrawing the respective supporting pole.

10. A solar ray collecting device according to claim 1, wherein motor means are provided for each of said supporting poles for rotating each of said supporting poles about the axis of each respective supporting pole.

11. A solar ray collecting device loaded and employed in a spacecraft comprising a cylindrical container means, a plurality of round solar ray collecting portions each having a light-receiving surface, each of said light-receiving surfaces having a surface area substantially equal to the circular cross-sectional area of the cylindrical container means, supporting arms for rotatably supporting each of said solar ray collecting portions, said supporting arms each having a generally C-shaped configuration having two terminating end sections and a central section, rotatable support means on said end sections for rotatably supporting said round solar ray collecting portions for rotation about a diametrical axis, first motor means on said supporting arm for rotating said round solar ray collecting portions about said diametrical axis, supporting poles supporting each of said supporting arms, second motor means provided for each of said supporting poles for rotating each of said supporting poles about the axis of each respective supporting pole, said rotatable supporting poles thereby rotating said supporting arms and the solar ray collecting portion supported on the respective supporting arm about the axis of the respective supporting pole, third motor means provided for each of said supporting poles for longitudinally extending and withdrawing the respective supporting pole, said supporting poles being thereby longitudinally movable to longitudinally extend and withdraw said supporting arms and the solar ray collecting portions supported on the respective supporting arm, whereby said solar ray collecting portions are movable into a non-deployed position in which the solar ray collecting portions are accommodated within said cylindrical container means and a deployed position in which said solar ray collecting portions are disposed outside of said cylindrical container for collecting solar rays, said round solar ray collecting portions being disposed in overlying and aligned relationship when in said non-deployed position in said cylindrical container means, and lid means comprising a plurality of lid members pivotably mounted on said cylinder container means for opening said cylinder container means to provide for moving said solar ray portions into said deployed position and for closing said container means when said solar ray collecting portions have been moved into said non-deployed position within said cylindrical container means.

* * * * *